(12) United States Patent
Deshmane et al.

(10) Patent No.: US 7,330,993 B2
(45) Date of Patent: Feb. 12, 2008

(54) SLEW RATE CONTROL MECHANISM

(75) Inventors: Mahesh J. Deshmane, Chandler, AZ (US); Mark A. Beiley, Chandler, AZ (US); Luke A. Johnson, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 419 days.

(21) Appl. No.: 10/675,875

(22) Filed: Sep. 29, 2003

(65) Prior Publication Data

US 2005/0071706 A1 Mar. 31, 2005

(51) Int. Cl.
*G06F 1/04* (2006.01)
*G06F 1/24* (2006.01)
*G06F 11/00* (2006.01)

(52) U.S. Cl. ............... 713/503; 713/500; 714/733; 714/734; 714/744; 714/798; 714/814; 714/815; 714/817; 714/824

(58) Field of Classification Search ........ 713/500–503, 713/400–601; 714/724–745, 798–824
See application file for complete search history.

(56) References Cited

U.S. PATENT DOCUMENTS

| | | | | |
|---|---|---|---|---|
| 4,704,642 A | * | 11/1987 | Namiki | 360/64 |
| 5,877,634 A | * | 3/1999 | Hunley | 326/83 |
| 5,959,481 A | * | 9/1999 | Donnelly et al. | 327/170 |
| 6,031,385 A | * | 2/2000 | Ilkbahar | 324/763 |
| 6,087,847 A | * | 7/2000 | Mooney et al. | 326/30 |
| 6,184,708 B1 | * | 2/2001 | Jenkins, IV | 326/39 |
| 6,237,107 B1 | * | 5/2001 | Williams et al. | 713/503 |
| 6,359,484 B1 | * | 3/2002 | Ajit | 327/170 |
| 6,366,114 B1 | * | 4/2002 | Liu et al. | 326/27 |
| 6,366,867 B2 | * | 4/2002 | Sine et al. | 702/107 |
| 6,388,486 B1 | * | 5/2002 | Schultz | 327/170 |
| 6,452,428 B1 | * | 9/2002 | Mooney et al. | 327/108 |
| 6,477,592 B1 | * | 11/2002 | Chen et al. | 710/52 |
| 6,614,285 B2 | * | 9/2003 | Lee et al. | 327/337 |
| 6,617,895 B2 | * | 9/2003 | Zumkehr et al. | 327/170 |
| 6,871,289 B2 | * | 3/2005 | Pullen et al. | 713/300 |
| 2004/0054845 A1 | * | 3/2004 | Ware et al. | 711/100 |

* cited by examiner

*Primary Examiner*—Rehana Perveen
*Assistant Examiner*—James F. Sugent
(74) *Attorney, Agent, or Firm*—Blakely, Sokoloff, Taylor & Zafman LLP

(57) ABSTRACT

According to one embodiment a computer system is disclosed. The computer system includes a bus and a chipset coupled to the bus. The chipset detects the slew rate of a signal transmitted over the bus by the chipset. In addition the chipset adjusts the slew rate based upon the state of the signal.

15 Claims, 4 Drawing Sheets

SLEW RATE CONTROL MECHANISM

FIELD OF THE INVENTION

The present invention relates to computer systems; more particularly, the present invention relates to high speed busses within computer systems.

BACKGROUND

In the past there has not been much concern with regards to maintaining signal edge rates (or slew rates) on busses. This is because there were little negative effects of having variable slew rates on slower speed busses. However as bus speeds increase, there are tighter restrictions on edge rates [volts/nanoseconds] of a signal switching high to low, or vice versa. If the slew rate is faster or slower, there could potentially be problems with signal integrity and transmissions. Thus, there are tight timing windows for signal transitions on the current high-speed busses.

Currently, the hardware design for integrated circuits are manually simulated and are deduced from a mechanism indicating process voltage and temperature (PVT) to determine the slew rate of the signals being transmitted on a high-speed bus. However if a mechanism indicating (PVT) is malfunctioning, it is impossible to determine slew rate.

DESCRIPTION OF THE DRAWINGS

The present invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

A slew rate control mechanism is described. In the following description, numerous details are set forth. It will be apparent, however, to one skilled in the art, that the present invention may be practiced without these specific details. In other instances, well-known structures and devices are shown in block diagram form, rather than in detail, in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
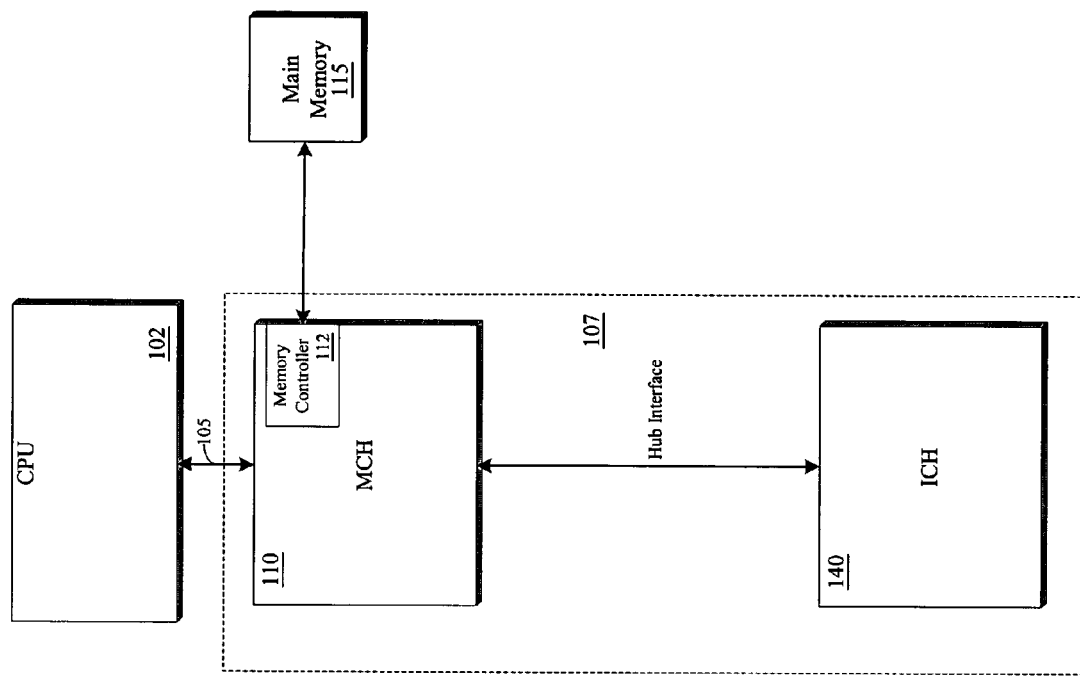
FIG. 1 illustrates one embodiment of a computer system.

FIG. 1 is a block diagram of one embodiment of a computer system 100. Computer system 100 includes a central processing unit (CPU) 102 coupled to bus 105. In one embodiment, CPU 102 is a processor in the Pentium® family of processors including the Pentium® II processor family, Pentium® III processors, and Pentium® IV processors available from Intel Corporation of Santa Clara, Calif. Alternatively, other CPUs may be used.

A chipset 107 is also coupled to bus 105. Chipset 107 includes a memory control hub (MCH) 110. MCH 110 may include a memory controller 112 that is coupled to a main system memory 115 via a memory bus. Main system memory 115 stores data and sequences of instructions and code represented by data signals that may be executed by CPU 102 or any other device included in system 100.

In one embodiment, main system memory 115 includes dynamic random access memory (DRAM); however, main system memory 115 may be implemented using other memory types. Additional devices may also be coupled to bus 105, such as multiple CPUs and/or multiple system memories.

In one embodiment, MCH 110 is coupled to an input/output control hub (ICH) 140 via a hub interface. ICH 140 provides an interface to input/output (I/O) devices within computer system 100. For instance, ICH 140 may be coupled to a Peripheral Component Interconnect bus adhering to a Specification Revision 2.1 bus developed by the PCI Special Interest Group of Portland, Oreg.

Figure 2:
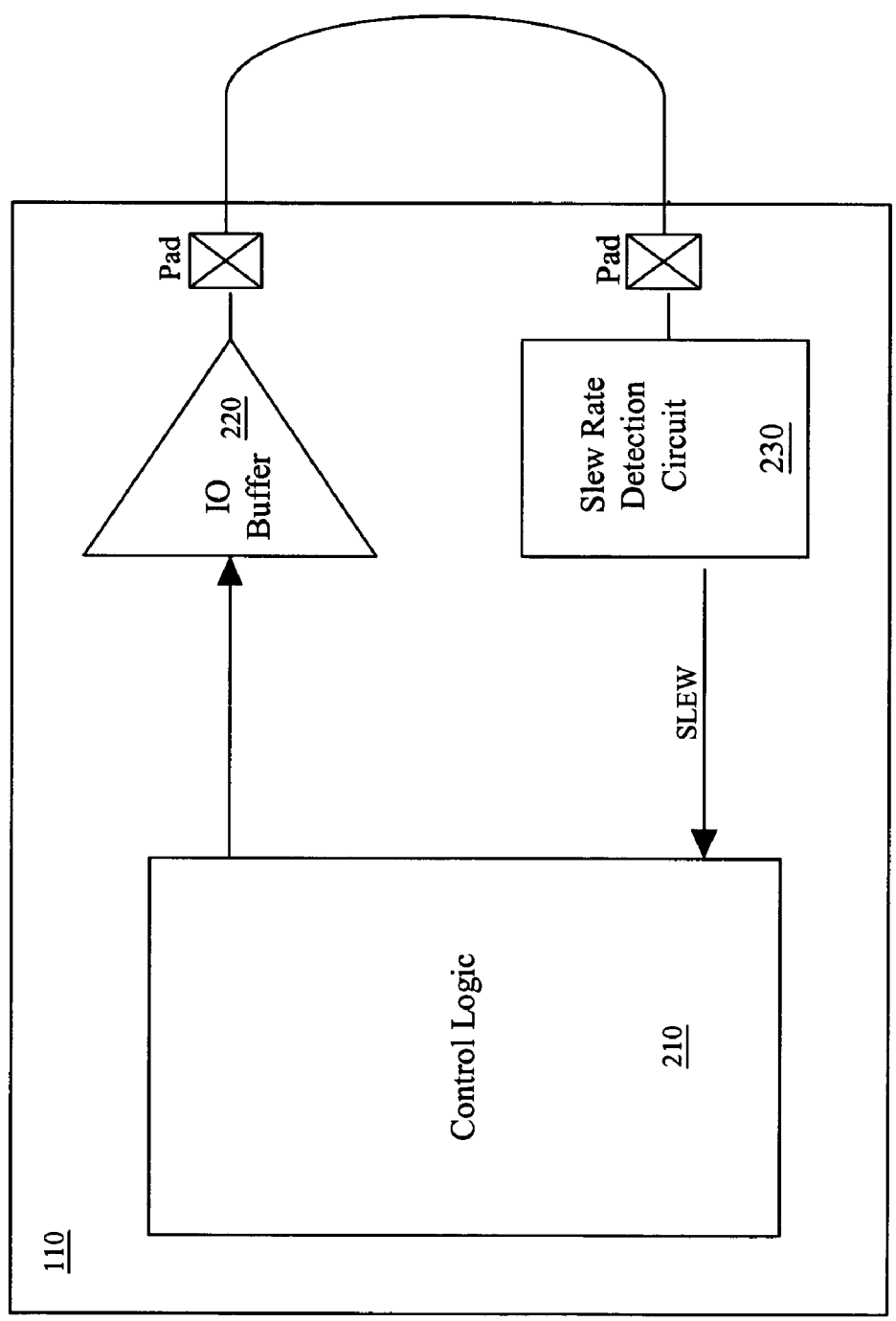
FIG. 2 illustrates a block diagram of one embodiment of a memory control hub.

According to one embodiment, the memory bus coupling MCH 110 and main memory 115 is a high-speed memory bus. FIG. 2 illustrates a block diagram of one embodiment of MCH 110 coupled to the memory bus. Although the attached bus is discussed herein as a memory bus, one of ordinary skill in the art will appreciate that other busses may be implemented without departing from the scope of the invention.

MCH 110 includes control logic 210, input/output (I/O) buffer 220 and slew rate detection circuit 230. Control logic 210 compensates the slew rate of a bus coupled to MCH. Particularly, control logic 210 examines slew rate (SLEW) signals received from slew rate detection mechanism 230 and modifies the I/O buffer 220 slew rate based on the state of the examined signal. For instance, if the SLEW signal received from slew rate detection circuit 230 indicates that the slew rate is too fast, control logic 210 reduces the slew rate at I/O buffer 220. Similarly, if the SLEW signal received from slew rate detection circuit 230 indicates that the slew rate is too slow, the slew rate at I/O buffer 220 is increased.

I/O buffer 220 is coupled to control logic 220 and an I/O pad. I/O buffer 220 is implemented to transmit output signals from MCH, and receive input signals from the coupled bus. I/O buffer 220 drives signals with a specific impedance and slew rate onto the bus. In one embodiment, the slew rate of the signal is controlled by control logic 210.

Figure 3:
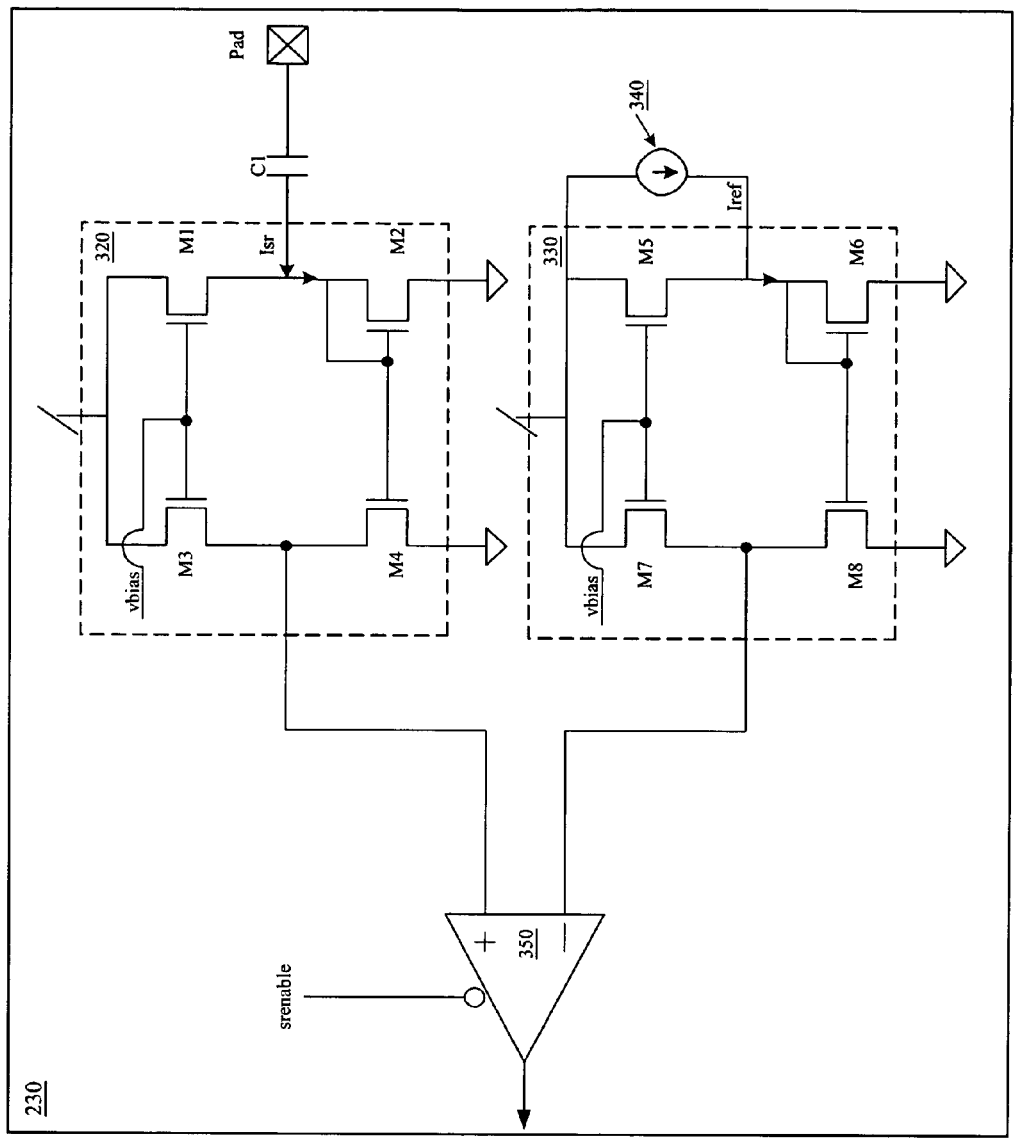
FIG. 3 illustrates embodiment of a slew rate detection circuit.

Slew rate detection circuit 230 is coupled to control logic 210 and a second I/O pad. Slew rate detection circuit 230 detects the slew rate of the signal transmitted by I/O buffer 220 and determines whether the slew rate is too fast or too slow. In response, detection circuit 230 generates the SLEW signal that is transmitted to control logic 210. FIG. 3 illustrates one embodiment of slew rate detection circuit 230.

Referring to FIG. 3, detection circuit 230 includes a capacitor C1 that is used integrate a waveform, which is to have its slew rate [dv/dt] adjusted. The resultant current C1*[dv/dt] is amplified and then compared to an internally generated reference current. This reference current Iref is proportional to the integrator capacitance C1.

However, the currents are first converted to voltages. Thus, detection circuit 230 includes current-voltage converters 320 and 330. Converter 320 converts the received current to an associated voltage value. Converter 320 includes a transistor M2 that is configured as a diode connected device. This helps to maintain a constant voltage on the other end of the capacitance. Therefore, the signal current (Isr) in the capacitance is truly proportional to the rate of change of voltage with respect to time [dv/dt] on the I/O pad.

Figure 4:
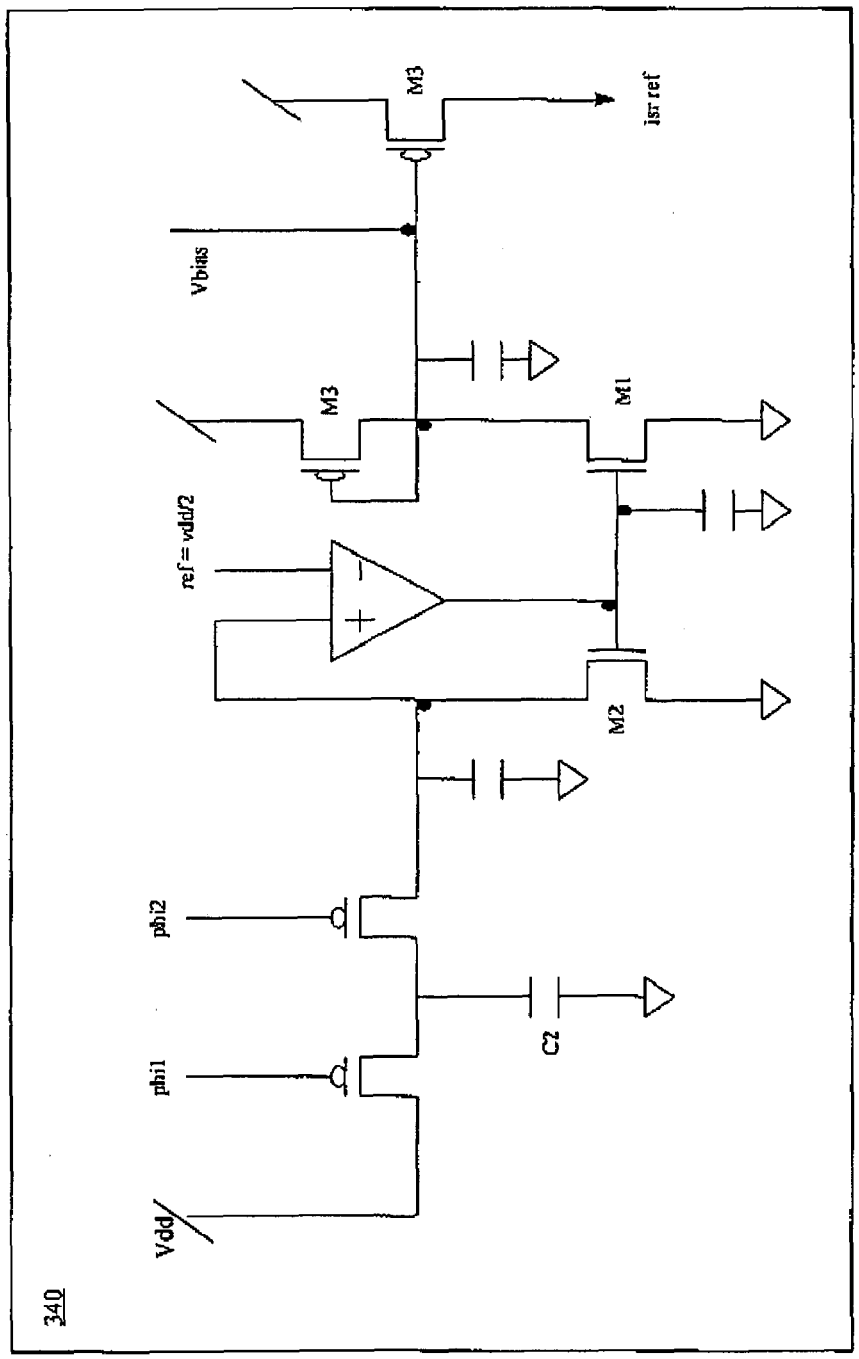
FIG. 4 illustrates one embodiment of a reference current generator.

Similarly, converter 330 converts a reference current (Iref) to a reference voltage. The reference current is generated from a reference current generator 340. In one embodiment, reference current generator 340 is a switched capacitor circuit. FIG. 4 illustrates one embodiment of a reference current generator 340. Current generator 340 generates the reference current Iref at the drain of a transistor M3.

Current generator 340 also includes a capacitor C2 and transistors phi1 and phi2. The gates of transistors phi1 and phi2 receive non-overlapping clock signals. In one embodiment, the clocks have a frequency of 1/T. In one embodiment, the capacitor C2 has a capacitance equivalent to the capacitor C1 coupled to the I/O pad. Therefore, C1=C2. In addition, reference current generator 340 receives a voltage Vdd.

As a result, Iref can be expressed as Vdd*C/[2*T]. Since Vdd and T can be maintained constant over process, voltage and temperature, the absolute value of Iref is dependant on the capacitance of C2. Due to their dependence on the capacitance value, Isr and Iref track each other in spite of any process variations and minimize the total compensation error. In one embodiment, slew rate controllability from 0.5v/ns to 3v/ns can be achieved using this circuit implementation.

Referring back to FIG. 3, the two currents Isr and Iref are compared at comparator 350 after being converted to voltages Vsr and Vref, respectively. In one embodiment, comparator 350 is an amplifier, as shown in FIG. 3. However, other types of comparators may be implemented in other embodiments. If the Vsr value falls below Vref, the SLEW signal is transmitted to control logic 210 indicating that the slew rate is too slow. However, if the Vsr value is above Vref, the SLEW signal is transmitted to control logic 210 indicating that the slew rate is too fast.

The above-described slew rate control mechanism enables the slew rate to be controlled on high-speed I/O busses.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as the invention.

What is claimed is:

1. A computer system comprising:
a bus; and
a chipset, coupled to the bus, having:
an input/output (I/O) buffer, coupled to the bus, to transmit an output signal from the chipset via the bus;
a slew rate detection mechanism, coupled to the bus, to receive the output signal transmitted from the I/O buffer, to detect a slew rate of the output signal and to generate a signal indicating a status of the slew rate, including:
a reference current generator to generate a reference current;
a comparator to compare the received signal current to the reference current
a first converter to convert the signal current to a signal voltage; and
a second converter, coupled to the reference current generator and the comparator to convert the reference to a reference voltage; and
control logic, coupled to the slew rate detection mechanism, to receive the signal and to adjust the slew rate based upon the state of the signal.

2. The computer system of claim 1 wherein the control logic reduces the slew rate if the signal received from the slew rate detection mechanism indicates that the slew rate is too fast.

3. The computer system of claim 1 wherein the control logic increases the slew rate if the signal received from the slew rate detection mechanism indicates that the slew rate is too slow.

4. The computer system of claim 1 wherein the slew rate detection mechanism includes a capacitor, coupled to the bus, to integrate the received signal current.

5. The computer system of claim 4 wherein the comparator is an operational amplifier.

6. The computer system of claim 1 wherein the bus is a high-speed bus.

7. A computer system comprising:
a main memory device;
a memory bus coupled to the main memory device; and
a memory controller, coupled to the bus, having:
an input/output (I/O) buffer, coupled to the bus, to transmit an output signal from the memory controller via the bus;
a slew rate detection mechanism, coupled to the bus, to receive the output signal transmitted from the I/O buffer, to detect a slew rate of the output signal and to generate a signal indicating a status of the slew rate, including:
a reference current generator to generate a reference current;
a comparator to compare the received signal current to the reference current;
a first converter to convert the signal current to a signal voltage; and
a second converter to convert the reference to a reference voltage; and
control logic, coupled to the slew rate detection mechanism, to receive the signal and to adjust the slew rate based upon the state of the signal.

8. The computer system of claim 7 wherein the control logic reduces the slew rate if the signal received from the slew rate detection mechanism indicates that the slew rate is too fast.

9. The computer system of claim 7 wherein the control logic increases the slew rate if the signal received from the slew rate detection mechanism indicates that the slew rate is too slow.

10. The computer system of claim 7 wherein the slew rate detection mechanism includes a capacitor, coupled to the bus, to integrate the received signal current.

11. A method comprising:
transmitting a signal from an input/output (I/O) buffer within a chipset over a bus;
receiving the signal at a slew rate detection mechanism within the chipset via the bus;
generating a status signal indicating the status of the slew rate by:
generating a reference current at the chipset;
converting the signal current to a signal voltage;
converting the reference current to a reference voltage; and comparing the reference voltage to the signal voltage; and adjusting the slew rate at control logic within the chipset based upon the status signal.

12. The method of claim 11 wherein adjusting the slew rate comprises modifying the amplification of a second signal at the I/O buffer.

13. An apparatus comprising:

an input/output (I/O) buffer to transmit an output signal; and a slew rate detection mechanism coupled to receive the output signal from the I/O buffer via a bus, to detect the slew rate of the output signal transmitted from the I/O buffer over a bus and to generate a signal to indicate the status of the slew rate, including:

a reference current generator to generate a reference current;

a comparator to compare the received signal current to the reference current;

a first converter to convert the signal current to a signal voltage; and a second converter to convert the reference to a reference voltage.

14. The apparatus of claim 13 further comprising control logic, coupled to the I/O buffer and the slew rate detection mechanism, to receive the signal and modify the slew rate based upon the signal.

15. The apparatus of claim 13 wherein the slew rate detection mechanism includes a capacitor, coupled to the bus, to integrate the received signal current.

* * * * *